S. T. FERGUSON.
CULVERT PIPE.
APPLICATION FILED MAY 27, 1908.
915,086.
Patented Mar. 16, 1909.
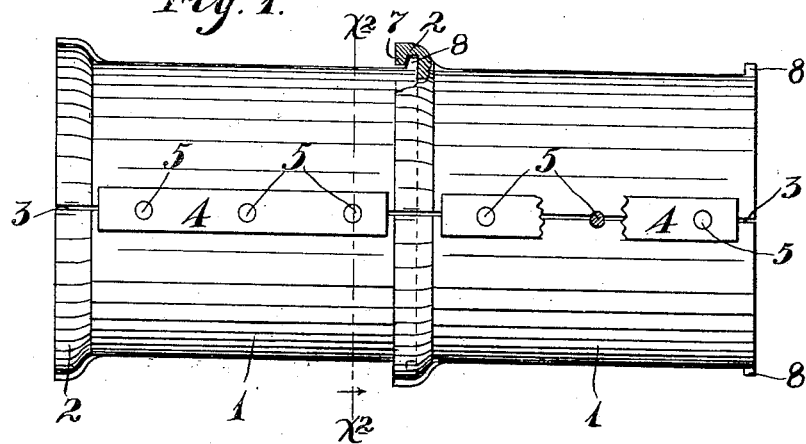
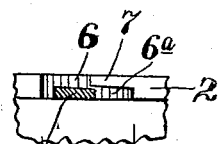
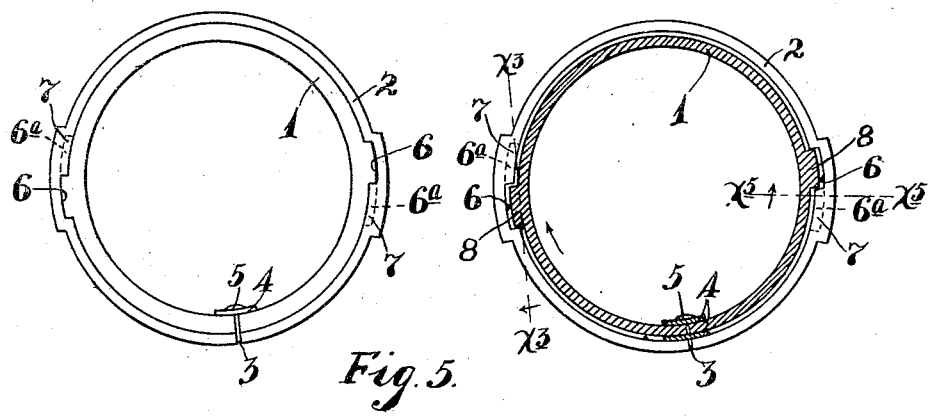
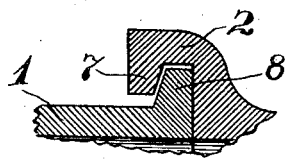
Witnesses.
Harry Opsahl.
L. L. Simpson.
Inventor
Sam T. Ferguson
By his Attorneys.
Williamson Merchant

UNITED STATES PATENT OFFICE.

SAM T. FERGUSON, OF MINNEAPOLIS, MINNESOTA.

CULVERT-PIPE.

No. 915,086.

Specification of Letters Patent.

Patented March 16, 1909.

Application filed May 27, 1908. Serial No. 435,214.

*To all whom it may concern:*

Be it known that I, SAM T. FERGUSON, a citizen of the United States, residing at Minneapolis, in the county of Hennepin and State of Minnesota, have invented certain new and useful Improvements in Culvert-Pipes; and I do hereby declare the following to be a full, clear, and exact description of the invention, such as will enable others skilled in the art to which it appertains to make and use the same.

My invention has for its object to provide an improved culvert pipe, and to this end it consists of the novel construction, combinations, and arrangement of parts hereinafter described and defined in the claims.

Pipes used in culverts and for similar purposes are frequently broken by freezing of water therein. To prevent this I slit the pipe sections and connect the slit edges by a tight joint which will, nevertheless, permit expansion of the pipe, to thereby prevent breaking when water is frozen solid therein. This improved expansion joint is particularly adapted for application to cast iron pipe sections, but it also makes possible the use of more fragile materials, such, for instance, as tile or earthen material.

As another feature of the invention, the pipe sections are connected by interlocking joints which serve to prevent unintentional endwise separation of the coupled pipe sections.

The invention is illustrated in the accompanying drawings, wherein like characters indicate like parts throughout the several views.

Referring to the drawings, Figure 1 is a plan view, with some parts broken away showing two connected pipe sections designed in accordance with my invention. Fig. 2 is a section taken on the line $x^2$—$x^2$ of Fig. 1. Fig. 3 is a fragmentary view partly in elevation and partly in section on the line $x^3$—$x^3$ of Fig. 2. Fig. 4 is an end elevation of one of the pipe sections; and Fig. 5 is a detail in section on the line $x^5$—$x^5$ of Fig. 2.

Each pipe section 1, at one end, has an enlarged flange 2 that is adapted to receive the small end of a pipe section which is to be connected thereto. These pipe sections are slit from end to end, as shown at 3, and the expansion joints thus formed are overlapped by inner and outer joint strips or thin metal bars 4 that are connected by rivets 5. The rivets 5 are passed through the slits 3 and the latter are preferably notched to afford clearance for the said rivets. The joint strips 4 form approximately water tight joints at the slit edges of the pipe sections, but at the same time permit the pipe sections to expand very materially and thus preventing breaking thereof when they are filled with water and the water frozen into ice. At the same time, these expansion joints do not weaken the pipe sections in their resistance to compressing or crushing strains, such as that produced by the weight of the earth thereon. Each pipe section within this enlarged end flange 2, is formed with approximately L-shaped lock notches 6—$6^a$ and with beveled lock lugs 7; and at their other ends the said pipe sections are formed with diametrically opposite beveled lock lugs 8. The lock lugs 8 are adapted to be engaged with the lock lugs 7 and the adjacent pipe section by first alining the said lugs 8 with the seat sections 6, then forcing the same axially and then rotating the same into the seat section $6^a$.

It is, of course, evident that when the pipe sections are coupled together as shown in Fig. 1, they will be securely held against accidental or unintentional endwise separation. In fact, the pipe sections can be coupled together or separated only by combined rotary and endwise movement. Preferably, the interlocking end joints and the expansible joints are so arranged that the latter will aline approximately when the pipe sections are coupled.

A sectional, interlocking and expansible pipe of the character above described, while especially adapted for use as a culvert pipe, is, nevertheless, capable of many other uses, as a drain pipe, sewer pipe, or, in fact, for almost any other use where an absolutely water tight pipe is required.

By reference to Fig. 3 it will be noted that the lugs 7 and 8 are beveled in a direction circumferentially of the pipe, and by reference to Fig. 5 it will be noted that said lugs are also beveled in cross section, that is, in a direction longitudinally of the pipe. This latter bevel gives a somewhat adjustable joint which will permit considerable sag in long pipes and also makes it possible to couple the pipe sections together when they are slightly out of true axial alinement.

What I claim is:

1. A pipe section slit to form an expansion joint and having inner and outer joint strips clamped to and embracing the slit edges thereof, substantially as described.

2. The combination with a pipe section slit from end to end, of inner and outer joint strips engaging and embracing the slit edges thereof, and rivets interposed between the slit edges of said pipe and frictionally clamping the said joint strips onto the said pipe, substantially as described.

In testimony whereof I affix my signature in presence of two witnesses.

SAM T. FERGUSON.

Witnesses:
   HARRY D. KILGORE,
   MALIE HOEL.